(12) United States Patent
Kodera (10) Patent No.: US 11,483,449 B2
(45) Date of Patent: Oct. 25, 2022

(54) COMPUTER-READABLE MEDIUM, INFORMATION PROCESSING DEVICE, AND METHOD FOR REARRANGING IMAGE DATA

(71) Applicant: Brother Kogyo Kabushiki Kaisha, Nagoya (JP)

(72) Inventor: Nobukazu Kodera, Okazaki (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/315,708

(22) Filed: May 10, 2021

(65) Prior Publication Data

US 2021/0377421 A1 Dec. 2, 2021

(30) Foreign Application Priority Data

May 29, 2020 (JP) .............................. JP2020-093881

(51) Int. Cl.
*H04N 1/387* (2006.01)
*H04N 1/00* (2006.01)
*G06F 3/12* (2006.01)
*G06K 15/00* (2006.01)

(52) U.S. Cl.
CPC ......... *H04N 1/3872* (2013.01); *H04N 1/0071* (2013.01); *H04N 1/00161* (2013.01); *H04N 1/00331* (2013.01); *H04N 1/00427* (2013.01); *H04N 1/00737* (2013.01); *G06F 3/1207* (2013.01); *G06F 3/1256* (2013.01); *G06K 15/002* (2013.01); *H04N 1/00456* (2013.01)

(58) Field of Classification Search
None
See application file for complete search history.

(56) References Cited

U.S. PATENT DOCUMENTS

| 9,794,435 | B1 * | 10/2017 | Islamov | ................ | G06F 3/1256 |
| 2002/0063896 | A1 * | 5/2002 | Rogalski, Jr. | ...... | H04N 1/00474 |
| | | | | | 358/1.18 |
| 2007/0121180 | A1 * | 5/2007 | Ogawa | .................. | H04N 1/622 |
| | | | | | 358/518 |

(Continued)

FOREIGN PATENT DOCUMENTS

JP 2018-006937 A 1/2018

*Primary Examiner* — Miya J Williams
(74) *Attorney, Agent, or Firm* — Burr & Brown, PLLC (57) ABSTRACT

A non-transitory computer-readable medium stores computer-readable instructions executable by a processor of an information processing device that includes a user interface and a display. The instructions are configured to, when executed by the processor, cause the information processing device to accept, via the user interface, an operation to specify a rearrangement condition for a plurality of pieces of image data to be obtained, obtain image data of a single sheet, determine an arrangement order for arranging first image data and second image data in accordance with the rearrangement condition specified by the accepted operation, the first image data being image data of one or more sheets obtained earlier than the second image data, the second image data being the image data of the single sheet, and display, on the display, images contained in the first image data and the second image data, to be arranged in the determined arrangement order.

9 Claims, 10 Drawing Sheets

(56) References Cited

U.S. PATENT DOCUMENTS

2014/0281965 A1* 9/2014 Yamaji .................. G06F 16/50
                                                      715/708
2019/0377484 A1* 12/2019 Yamaji ............... G06Q 30/0282
2020/0259971 A1* 8/2020 Miyamoto ......... H04N 1/00779

* cited by examiner

| REARRANGEMENT ITEM LIST | 28a |
|---|---|
| Width | TRUE |
| Height | TRUE |
| Resolution | TRUE |
| Capacity | TRUE |
| Contrast | TRUE |
| Brightness | TRUE |
| Orientation | TRUE |
| OCR Character Order | TRUE |
| Document Size | TRUE |
| Scan Date and Time | TRUE |
| Extension | TRUE |
| User Information | TRUE |
| RGB Information | TRUE |

COMPUTER-READABLE MEDIUM, INFORMATION PROCESSING DEVICE, AND METHOD FOR REARRANGING IMAGE DATA

CROSS-REFERENCE TO RELATED APPLICATION

This application claims priority under 35 U.S.C. § 119 from Japanese Patent Application No. 2020-093881 filed on May 29, 2020. The entire subject matter of the application is incorporated herein by reference.

BACKGROUND

Technical Field

Aspects of the present disclosure are related to a computer-readable medium, an information processing device, and a method, for obtaining image data and rearranging a plurality of images contained in the obtained image data.

Related Art

An image forming apparatus has been known that is configured to, when a composite image, in which a plurality of output element images selected from among a plurality of original images of different sizes are arranged in accordance with a set relative positional relationship, does not fit within an effective area of one output sheet, calculate a conversion magnification for reducing the composite image to a maximum-size image fittable within the effective area, and display a preview of the composite image having a size adjusted according to the calculated conversion magnification.

SUMMARY

However, in the known image forming apparatus, the plurality of output element images are not rearranged automatically but need to be rearranged according to user operations. Hence, the user has to perform a troublesome rearranging operation for each output element image.

Aspects of the present disclosure are advantageous to provide one or more improved techniques to automatically rearrange a plurality of images contained in obtained image data in a user-intended order and display the plurality of images rearranged.

According to aspects of the present disclosure, a non-transitory computer-readable medium is provided, which stores computer-readable instructions executable by a processor of an information processing device that includes a user interface and a display. The instructions are configured to, when executed by the processor, cause the information processing device to accept, via the user interface, an operation to specify a rearrangement condition for a plurality of pieces of image data to be obtained, obtain image data of a single sheet, determine an arrangement order for arranging images contained in first image data and second image data, in accordance with the rearrangement condition specified by the accepted operation, the first image data being image data of one or more sheets obtained earlier than the second image data, the second image data being the image data of the single sheet, and display, on the display, the images contained in the first image data and the second image data, to be arranged in the determined arrangement order.

According to aspects of the present disclosure, further provided is an information processing device that includes a user interface, a display, and a controller. The controller is configured to accept, via the user interface, an operation to specify a rearrangement condition for a plurality of pieces of image data to be obtained, obtain image data of a single sheet, determine an arrangement order for arranging first image data and second image data in accordance with the rearrangement condition specified by the accepted operation, the first image data being image data of one or more sheets obtained earlier than the second image data, the second image data being the image data of the single sheet, and display, on the display, images contained in the first image data and the second image data, to be arranged in the determined arrangement order.

According to aspects of the present disclosure, further provided is a method implementable on a processor of an information processing device that includes a user interface and a display. The method includes accepting, via the user interface, an operation to specify a rearrangement condition for a plurality of pieces of image data to be obtained, obtaining image data of a single sheet, determining an arrangement order for arranging first image data and second image data in accordance with the rearrangement condition specified by the accepted operation, the first image data being image data of one or more sheets obtained earlier than the second image data, the second image data being the image data of the single sheet, and displaying, on the display, images contained in the first image data and the second image data, to be arranged in the determined arrangement order.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

Hereinafter, an illustrative embodiment according to aspects of the present disclosure will be described with reference to the accompanying drawings.

Figure 1:
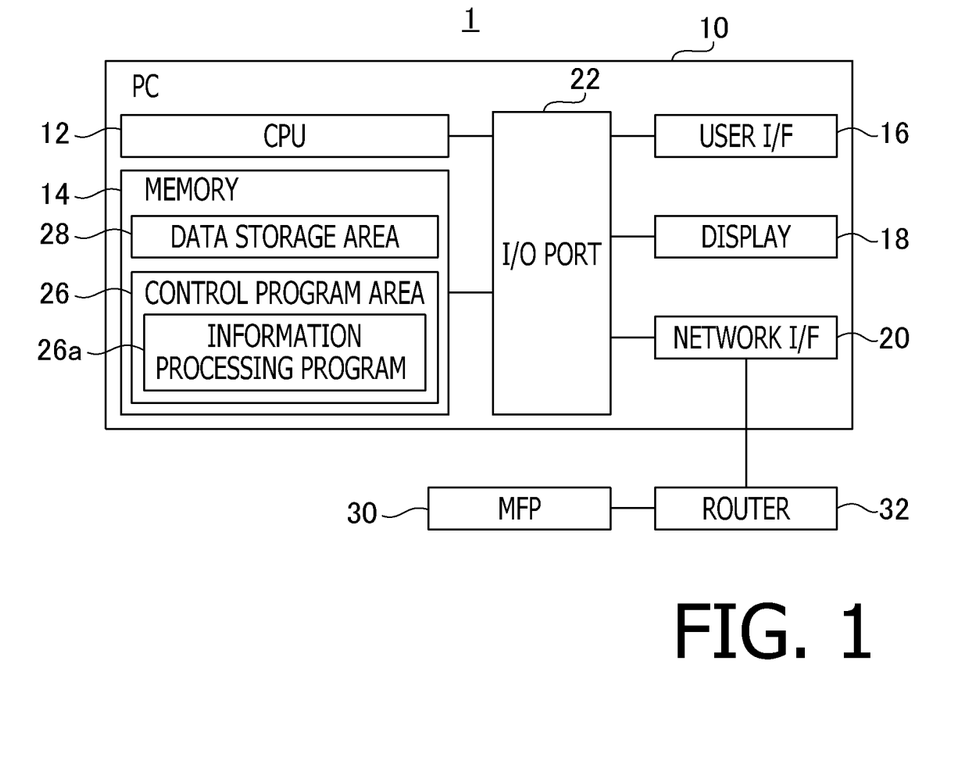
FIG. 1 is a block diagram of an image forming system including a PC and a multi-function peripheral (hereinafter referred to as an "MFP"), in an illustrative embodiment according to one or more aspects of the present disclosure.

FIG. 1 is a block diagram schematically showing a control configuration of an image forming system 1 in an illustrative embodiment. The image forming system 1 includes a PC 10, an MFP ("MFP" is an abbreviation of "Multi-Function Peripheral") 30, and a router 32.

The PC 10 includes a CPU 12, a memory 14, a user I/F ("I/F" is an abbreviation of "interface") 16, a display 18, and a network I/F 20. The CPU 12, the memory 14, the user I/F 16, the display 18, and the network I/F 20 are communicably interconnected via an input/output port (hereinafter referred to as an "I/O port") 22.

The user I/F 16 may include a keyboard and a mouse. The display 18 includes a display device (e.g., a liquid crystal display, and an organic EL display) and a drive circuit to drive the display device. When a touch panel type is used as the display 18, a user is allowed to perform input operations by clicking input buttons on the screen. Therefore, in this case, the display 18 also serves as the user I/F 16. In other words, the display 18 may be included in the user I/F 16.

The CPU 12 is configured to execute various application programs (hereinafter, which may be simply referred to as "applications") and firmware. The applications include a below-mentioned information processing program 26a of the illustrative embodiment.

The memory 14 includes a ROM, a RAM, an HDD, an SSD, and an optical disk drive. The memory 14 has a data storage area 28 and a control program area 26. The data storage area 28 is an area for storing scanned data obtained from the MFP 30, and data necessary for the CPU 12 to perform the information processing program 26a. The control program area 26 is an area for storing an OS, the information processing program 26a, the other applications, and the firmware. It is noted that the CPU 12 and the memory 14 storing the information processing program 26a form a "controller" to control operations by the PC 10.

In the image forming system 1, the MFP 30 performs a scanning process according to a scan command from the PC 10 executing the information processing program 26a, and transmits, to the PC 10, scanned data generated in the scanning process by the MFP 30.

Figure 2A:
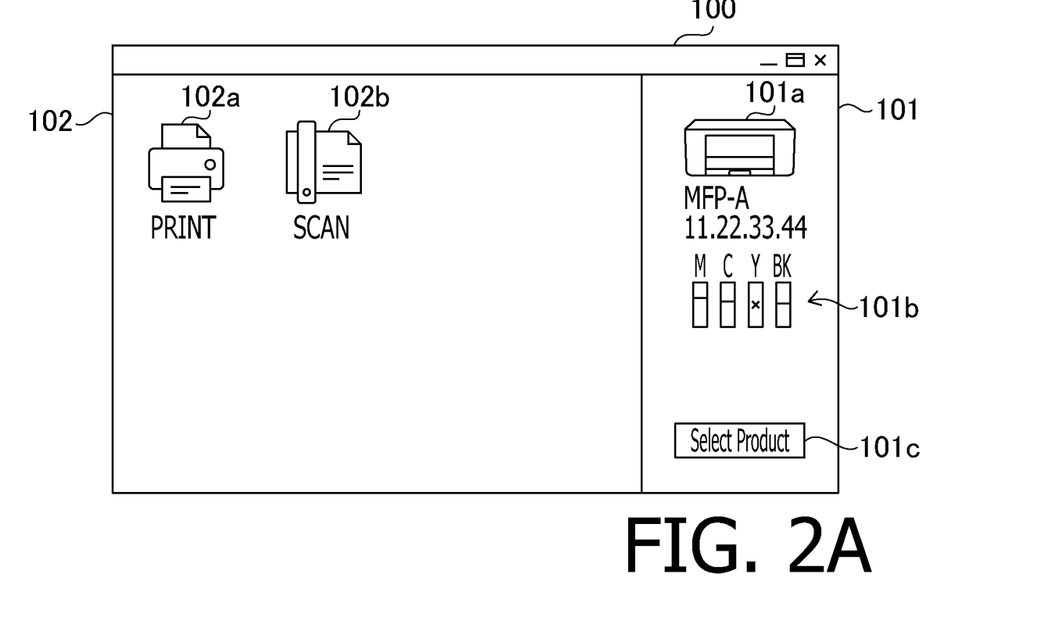
FIG. 2A shows an example of an initial screen displayed on a display of the PC, in the illustrative embodiment according to one or more aspects of the present disclosure.
Figure 2B:
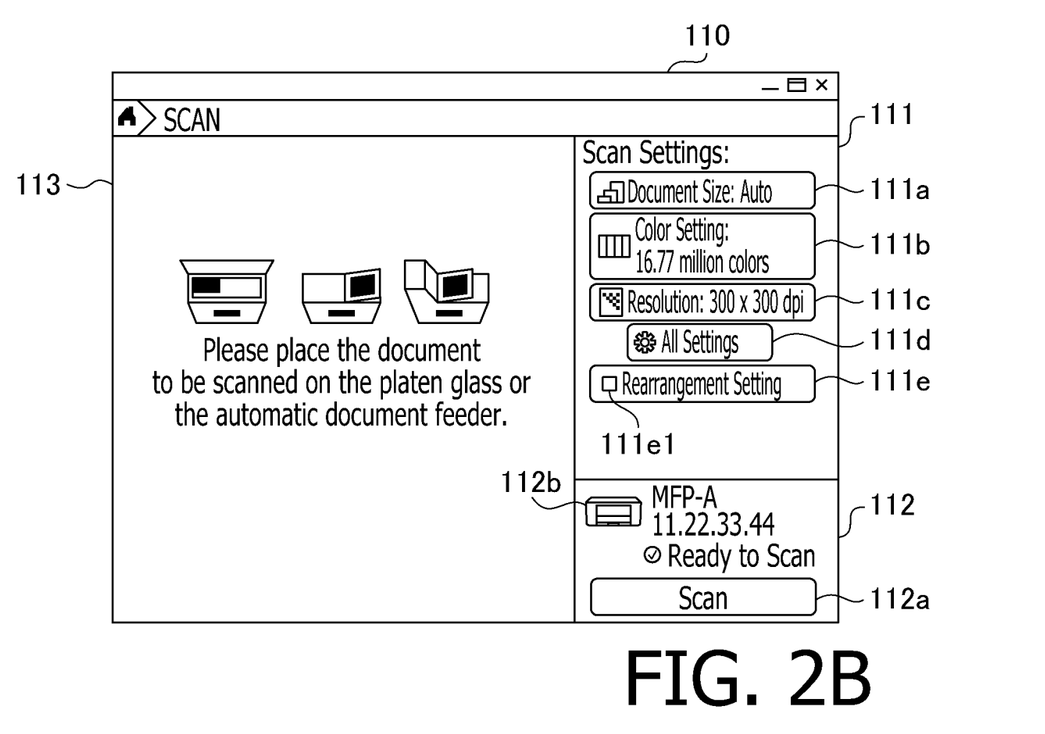
FIG. 2B shows an example of a scan screen displayed on the display of the PC, in the illustrative embodiment according to one or more aspects of the present disclosure.

FIGS. 2A and 2B show examples of display screens shown on the display 18 while the information processing program 26a is being executed. FIG. 2A shows an initial screen (hereinafter referred to as a "HOME screen") 100 that is the first screen displayed after the information processing program 26a is started. FIG. 2B shows a scan screen 110 for causing the MFP 30 to perform image scanning of a document.

The HOME screen 100 (see FIG. 2A) shows a state in which an MFP with a product name "MFP-A" has already been selected as the MFP 30 to be controlled. In a selected device display area 101 for displaying the selected device, an icon 101a is displayed that shows an appearance of the selected device. Below the icon 101a, the product name "MFP-A" and an IP address "11.22.33.44" are displayed. Furthermore, a status 101b, such as information on remaining ink amounts, of the selected device is displayed.

Further, a "Select Product" button 101c is also displayed in the selected device display area 101. The "Select Product" button 101c is a button to be pressed when the user wishes to select a different device from the currently selected MFP (i.e., "MFP-A"). In some cases, no device may have been selected as the device to be controlled. In such cases, the "Select Product" button 101c is used to select the device to be controlled.

When the "Select Product" button 101c is pressed, the PC 10, especially the CPU 12, searches for devices existing on a communication network connected via the network I/F 20, and displays search results on the display 18. When the user provides an instruction for selecting a device from among the found devices, the selected device is displayed in the selected device display area 101.

Further, the HOME screen 100 has a function list area 102. The function list area 102 is an area for listing functions of the device displayed in the selected device display area 101. The device with the product name "MFP-A" is a multi-function peripheral that has a printing function and a scanning function. Therefore, the function list area 102 displays therein a print icon 102a indicating the printing function and a scan icon 102b indicating the scanning function.

In FIG. 2A, when the user operates the scan icon 102b, the scan screen 110 is displayed on the display 18, as shown in FIG. 2B. The scan screen 110 has a scan setting area 111, a scan instruction area 112, and a caution display area 113.

The scan setting area 111 displays therein buttons 111a-111c to display three types of major settings among current scan settings, an "All Settings" button 111d to provide an instruction to display all settings, and a "Rearrangement Setting" button 111e to select a rearrangement setting.

The buttons 111a-111c display thereon current settings for "Document Size," "Color Setting," and "Resolution," respectively. Further, each of the buttons 111a-111c is configured to, when pressed, accept an input to change a corresponding type of scan setting associated with the pressed button.

When the "All Settings" button 111d is pressed, a setting window, which enables the user to change all types of scan settings, is displayed in a pop-up manner on the scan screen 110. Using the setting window, the user is allowed to change all types of changeable scan settings including the aforementioned setting items "Document Size," "Color Setting," and "Resolution."

The "Rearrangement Setting" button is configured to, each time pressed, toggle between selection and deselection of the rearrangement setting. The selection/deselection of the rearrangement setting is indicated by whether a check mark "✓" is displayed in a check box 111e1.

In the scan instruction area 112, a scan button 112a for sending a scan command to the MFP 30 is displayed. In addition, an icon 112b similar to the above icon 101a is displayed in the scan instruction area 112. The icon 112b is for showing to which device the scan command is sent. Further, the product name "MFP-A," the IP address "11.22.33.44," and an operation status "Ready to Scan" of the MFP 30 are displayed adjacent to the icon 112b.

In the caution display area 113, a caution "Please place the document to be scanned on the platen glass or the automatic document feeder" and an image related to the caution are displayed.

Figure 3A:
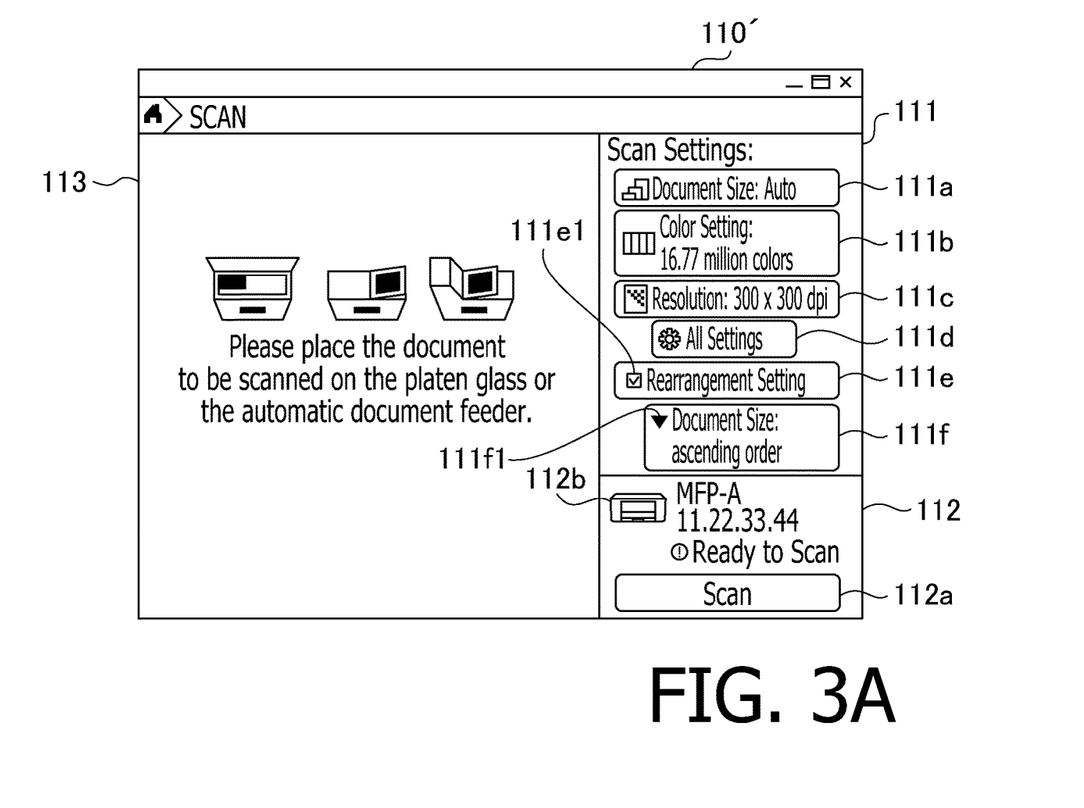
FIG. 3A shows an example of a scan screen displayed when a rearrangement setting is selected on the scan screen shown in FIG. 2B, in the illustrative embodiment according to one or more aspects of the present disclosure.

FIG. 3A shows an example of a scan screen 110' displayed when the check mark "✓" is displayed in the check box 111e1, and the rearrangement setting is selected on the scan screen 110 shown in FIG. 2B. The scan screen 110' shown in FIG. 3A is different from the scan screen 110 shown in FIG. 2B in that a "Current Rearrangement Setting" button 111f is displayed.

Figure 3B:
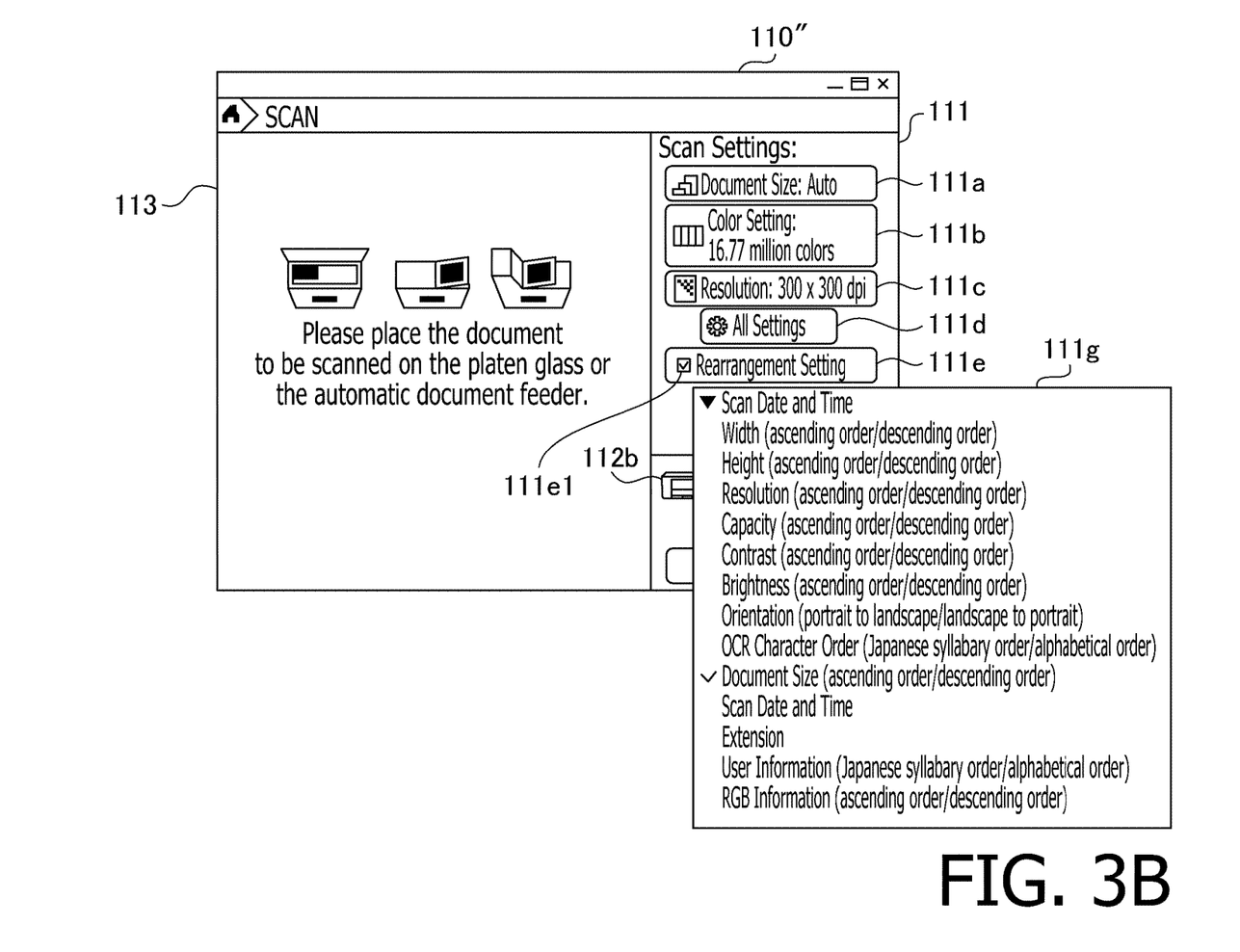
FIG. 3B shows an example of a scan screen on which a pull-down menu is displayed, after an operator of a "Current Rearrangement Setting" button is operated on the scan screen shown in FIG. 3A, in the illustrative embodiment according to one or more aspects of the present disclosure.

On the "Current Rearrangement Setting" button 111f, an operator 111f1 is displayed. The operator 111f1 is an operable member for providing an instruction to display a pull-down menu to change a rearrangement condition. FIG. 3B shows an example of a scan screen 110" on which a pull-down menu 111g is displayed, after the operator 111f1 is operated on the scan screen 110' shown in FIG. 3A.

The pull-down menu 111g contains a plurality of selectable items for the rearrangement condition listed, such as Width (ascending order/descending order), Height (ascending order/descending order), Resolution (ascending order/descending order), Capacity (ascending order/descending order), Contrast (ascending order/descending order), Brightness (ascending order/descending order), Orientation (portrait to landscape/landscape to portrait), OCR Character Order (Japanese syllabary order/alphabetical order), Document Size (ascending order/descending order), Scan Date and Time, Extension, User Information (Japanese syllabary order/alphabetical order), and RGB Information (ascending order/descending order). The currently-selected rearrangement condition is marked with the check mark "✓." Each rearrangement condition with parentheses indicates that one of the conditions listed in the parentheses needs to be further selected. For instance, the currently-selected arrangement condition "Document Size" has the parentheses with "ascending order/descending order" therein. Hence, when the rearrangement condition "Document Size" is selected, one of the conditions "ascending order" and "descending order" needs to be further selected. In the scan screen 110' shown in FIG. 3A, "Document Size: ascending order" is selected as the rearrangement condition, as shown on the "Current Rearrangement Setting" button 111f.

The items "Width" and "Height" represent the width and the height of each scanned document, respectively. For instance, when "Width: ascending order" is selected as the rearrangement condition, the scanned data is rearranged in an ascending order from a narrowest document width to a widest document width. The items "Resolution," "Contrast," and "Brightness" represent "Resolution," "Contrast," and "Brightness" in the scan settings, respectively. For instance, when "Resolution: descending order" is selected as the rearrangement condition, the scanned data is rearranged in a descending order from a highest resolution to a lowest resolution. The item "Capacity" represents the data capacity of each document data included in the scanned data. For instance, when "Capacity: ascending order" is selected as the rearrangement condition, the scanned data is rearranged in an ascending order from a smallest data capacity to a largest data capacity. The item "Document Size" represents the size of each scanned document. For instance, when "Document Size: ascending order" is selected as the rearrangement condition, the scanned data is rearranged in an ascending order from a smallest document size to a largest document size. The items "Orientation" and "OCR Character Order" represent the orientation and the character order of a character string obtained by OCR processing of character information written on each scanned document, respectively. For instance, when "OCR Character Order: Japanese syllabary order" is selected as the rearrangement condition, the scanned data is rearranged in a Japanese syllabary order of, e.g., the first letter of a character string obtained from each scanned document. The item "Scan Date and Time" represents the date and time when each document was scanned. The item "Extension" represents an extension for a file in which each document data of the scanned data is saved. The item "User Information" represents personal information (e.g., a name) of a user who scanned each document. The item "RGB information" represents RGB information regarding each pixel included in the scanned data. For instance, the RGB information may take a value from a maximum value (255, 255, 255) to a minimum value (0, 0, 0).

Figure 4:
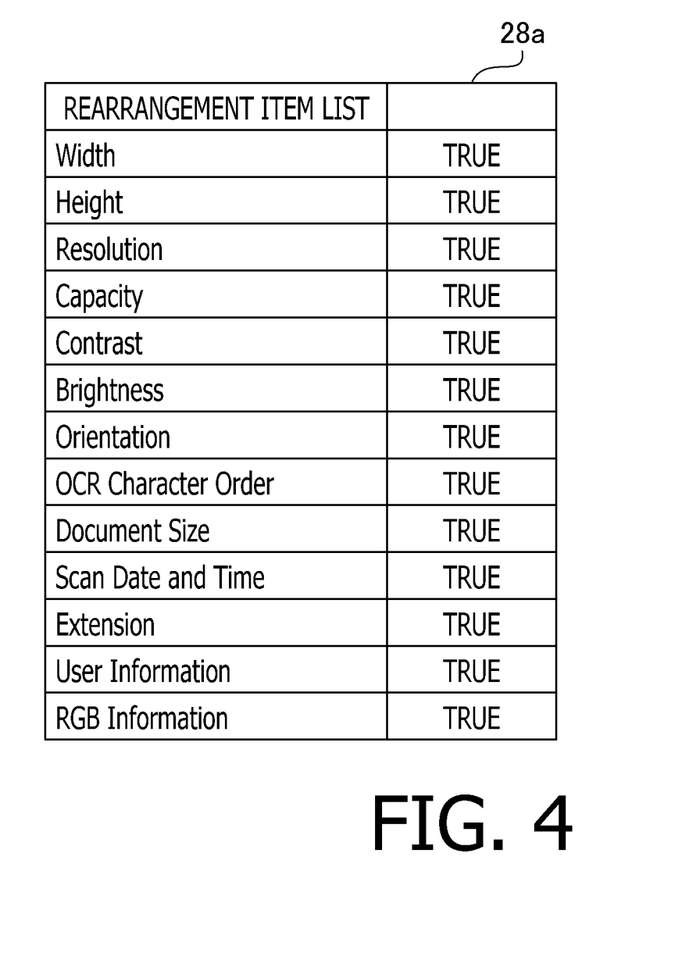
FIG. 4 shows an example of a rearrangement item list stored in a data storage area of a memory of the PC, in the illustrative embodiment according to one or more aspects of the present disclosure.

A list of the selectable items for the rearrangement condition in the pull-down menu 111g is not fixed and changes depending on the contents of the current scan settings. FIG. 4 shows an example of a rearrangement item list 28a to be used to determine one of the selectable items for the rearrangement condition listed in the pull-down menu 111g. The rearrangement item list 28a contains a maximum number of items selectable as the rearrangement condition, and flags each of which indicates whether a corresponding item should be listed in the pull-down menu 111g. Each flag takes one of the values "TRUE" and "FALSE." Items associated with flags of "TRUE" are listed in the pull-down menu 111g (see a below-mentioned step S8 in FIG. 7). It is determined according to the contents of the current scan settings whether each flag is "TRUE" or "FALSE" (see below-mentioned steps S4 and S6 in FIG. 7). For instance, when a setting value "Document Size: A4" is selected instead of a currently-set value "Document Size: Auto," the flags associated with the items "Width", "Height", and "Document Size" are set to "FALSE." The reasons are as follows. In this case, the document size is fixed to "A4." Therefore, even though any of the items "Width", "Height," and "Document Size" is selected as the rearrangement condition, the selected rearrangement condition has the same value for all the scanned data. Hence, the scanned data is unable to be rearranged according to the selected rearrangement condition. Further, for instance, when an OCR function is not set active in the current scan settings, flags associated with the items "Orientation" and "OCR Character Order" are set to "FALSE." The reasons are as follows. In this case, there are no character strings obtained from the scanned documents. Therefore, even though any of the items "Orientation" and "OCR Character Order" is selected as the rearrangement condition, the scanned data is unable to be rearranged according to the selected rearrangement condition.

Thus, the flag associated with each item contained in the rearrangement item list 28a is set to a value ("TRUE" or "FALSE") according to the contents of the current scan settings. Further, the pull-down menu 111g lists therein items for the rearrangement condition that are associated with the flags of "TRUE." Therefore, a list of the selectable items for the rearrangement condition in the pull-down menu 111g changes depending on the contents of the current scan settings.

Figure 7:
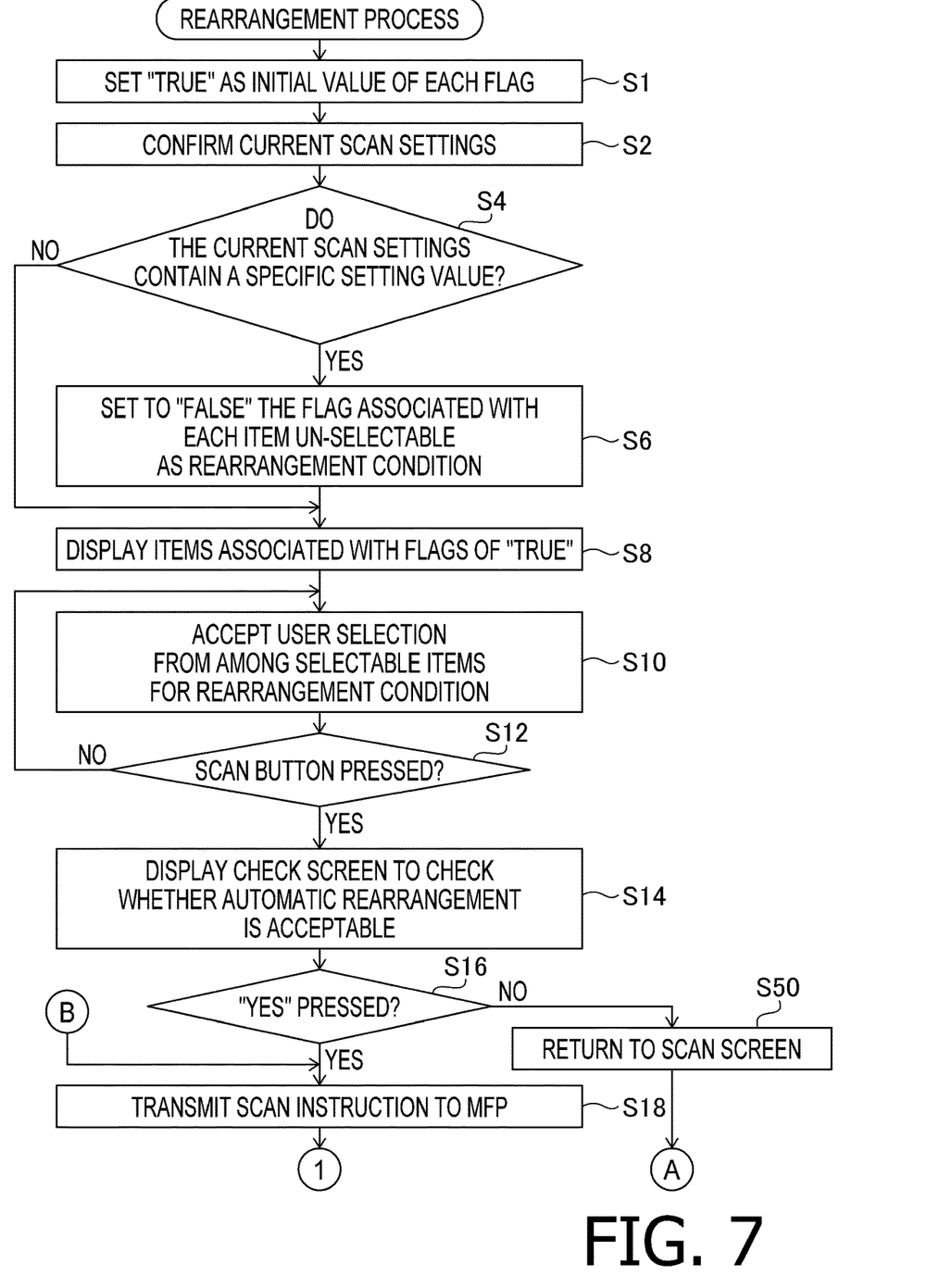
FIGS. 7, 8, and 9 are flowcharts showing a procedure of a rearrangement process to be performed by a CPU of the PC, in the illustrative embodiment according to one or more aspects of the present disclosure.
Figure 8:
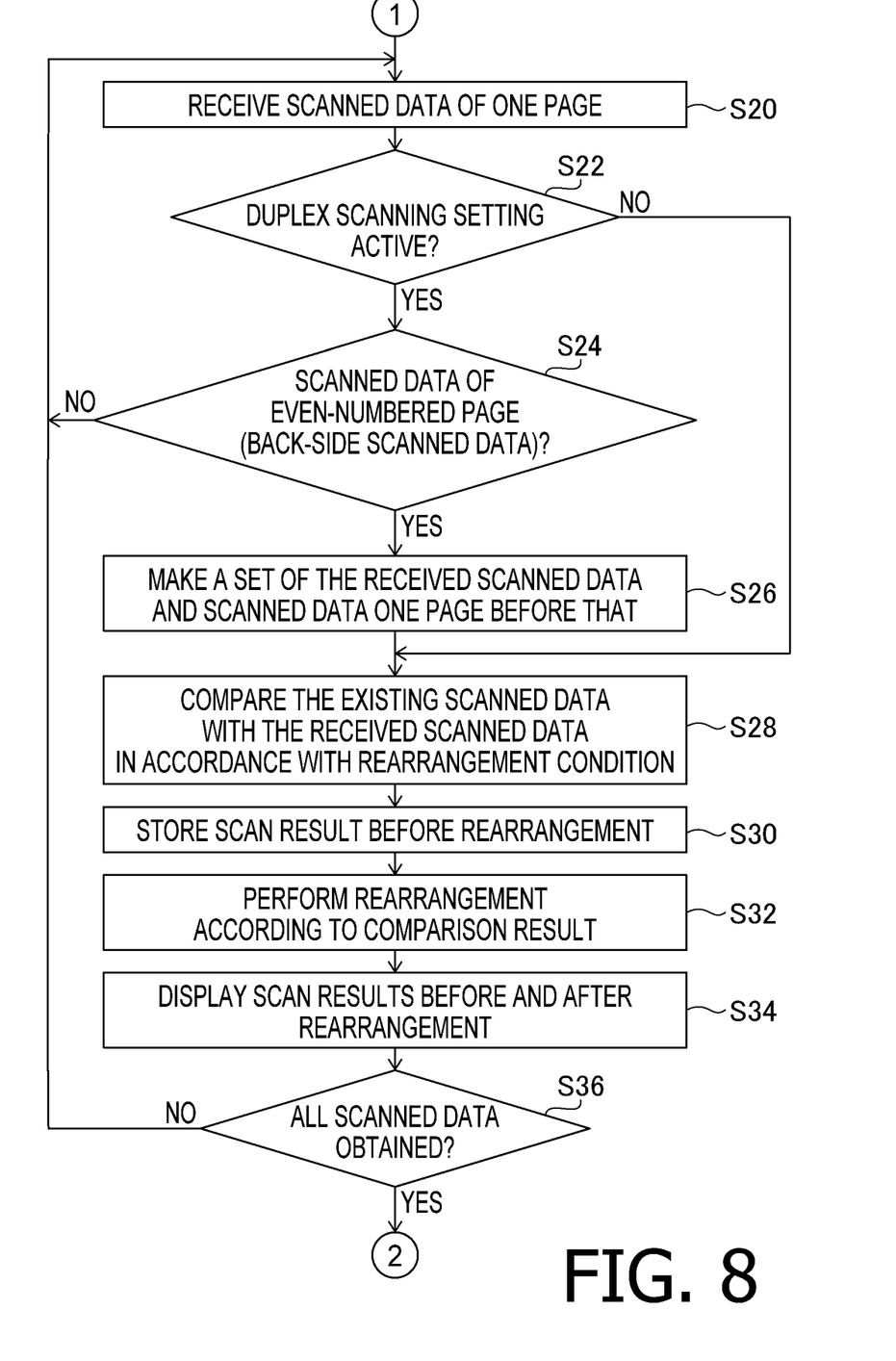
Figure 9:
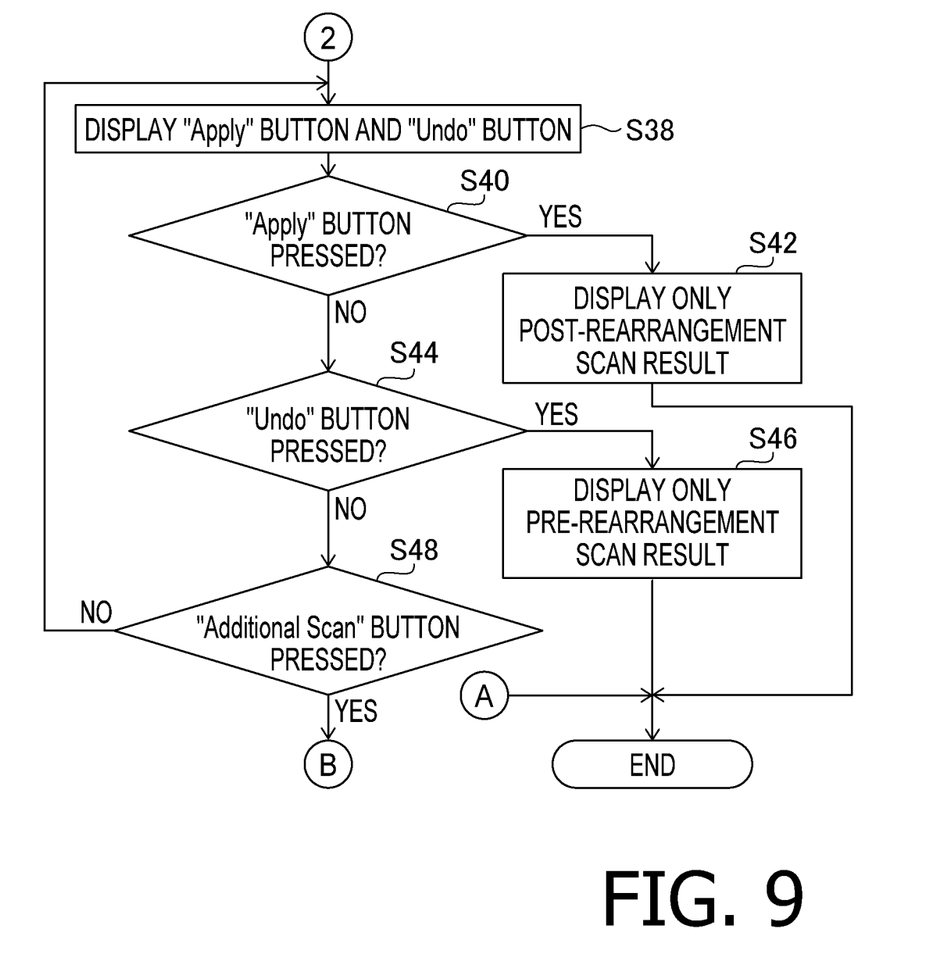

FIGS. 7 to 9 show a procedure of a rearrangement process to be performed by the CPU 12 of the PC 10. The rearrangement process is performed, for instance, in response to a user operation to the operator 111f1 on the scan screen 110' (see FIG. 3A). In the following descriptions about a sequence of processes included in the rearrangement process, each step is represented by "S" attached in front of a corresponding numeral.

In FIG. 7, the CPU 12 first sets "TRUE" as an initial value of each flag in the rearrangement item list 28a (S1). Next, the CPU 12 confirms the current scan settings (S2). On the scanning screen 110" shown in FIG. 3B, the three types of major settings, among the current scan settings, are "Document size: Auto," "Color setting: 16.77 million colors," and "Resolution: 300×300 dpi."

Subsequently, the CPU 12 determines whether the current scan settings contain a specific setting value (S4). Here, the "specific setting value" is a setting value representing that there is a condition un-selectable as the rearrangement condition. Specifically, for instance, when the setting value "Document Size: A4" is set instead of the currently-set value "Document Size: Auto," as described above, the items "Width," "Height," and "Document Size" are un-selectable as the rearrangement condition. Namely, since "Document Size: A4" is a specific setting value, in this case, it is determined that the current scan settings contain a specific setting value.

When determining in S4 that the current scan settings contain a specific setting value (S4: Yes), the CPU 12 sets the flag associated with each item un-selectable as the rearrangement condition to "FALSE" (S6). Afterward, the CPU 12 goes to S8. In the aforementioned example, the flags associated with the items "Width," "Height," and "Document Size" are set to "FALSE."

Meanwhile, when determining in S4 that the current scan settings do not contain a specific setting value (S4: No), the CPU 12 goes to S8.

In S8, the CPU 12 displays, on the display 18, the items associated with the flags of "TRUE." Specifically, the CPU 12 reads out the items associated with the flags set to "TRUE" from the rearrangement item list 28a, and displays the read items on the display 18, for instance, in substantially the same form as the above pull-down menu 111g (see FIG. 3B). In the example of the rearrangement item list 28a shown in FIG. 4, each of all the items for the rearrangement condition is associated with the flag of "TRUE." Therefore, in this case, all the items for the rearrangement condition are read out and displayed on the display 18.

Next, the CPU 12 accepts a user selection of an item from the pull-down menu 111g (S10). In the pull-down menu 111g (see FIG. 3B), the item "Document Size" is specified with the check mark "✓" Thus, in this case, it is clearly indicated that the user has selected the item "Document Size" as the rearrangement condition.

Subsequently, the CPU 12 determines whether the scan button 112a (see FIG. 3A) has been pressed (S12). When determining in S12 that the scan button 112a has not been pressed (S12: No), the CPU 12 goes back to S10. Meanwhile, when determining that the scan button 112a has been pressed (S12: Yes), the CPU 12 goes to S14. Namely, the CPU 12 is enabled to accept a user selection of the rearrangement condition until the scan button 112a is pressed.

Figure 5A:
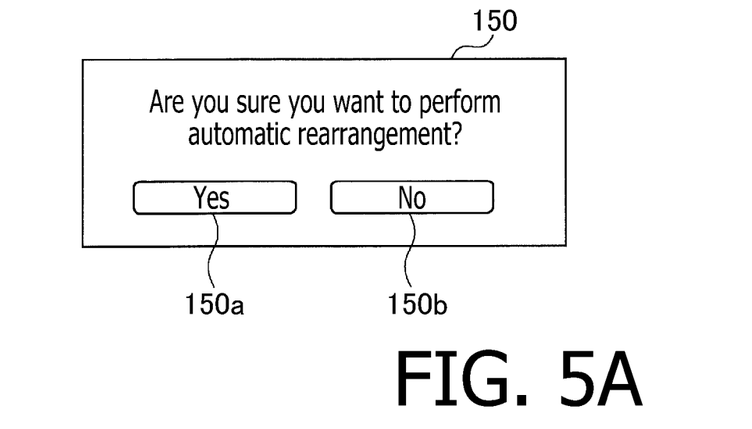
FIG. 5A shows an example of a check screen displayed in a pop-up manner on the display of the PC, in the illustrative embodiment according to one or more aspects of the present disclosure.

In S14, the CPU 12 displays a check screen to check whether automatic rearrangement is acceptable. FIG. 5A shows an example of a check screen 150. The check screen 150 is displayed in a pop-up manner, for instance, when the scan button 112a is pressed on the scan screen 110' (see FIG. 3A). The check screen 150 displays thereon a "Yes" button 150a to provide an instruction to perform automatic rearrangement, and a "No" button 150b to reject automatic rearrangement, along with a message "Are you sure you want to perform automatic rearrangement?"

Next, the CPU 12 determines whether the "Yes" button 150a has been pressed (S16). When determining that the "Yes" button 150a has been pressed (S16: Yes), the CPU 12 transmits a scan instruction to the MFP 30 (S18). Thereafter, the CPU 12 proceeds to S20 (see FIG. 8). Meanwhile, when determining that the "No" button 150b has been pressed (S16: No), the CPU 12 deletes the check screen 150 and displays the scan screen 110' foremost back again (S50). Afterward, the CPU 12 terminates the rearrangement process.

In S20 (see FIG. 8), the CPU 12 receives scanned data of one page from the MFP 30. The scanned data has been generated by the MFP 30 scanning a single page of document in response to the scan instruction from the PC 10. Then, the CPU 12 determines whether a duplex scanning setting is active (S22). When determining that the duplex scanning setting is active (S22: Yes), the CPU 12 determines whether the received scanned data of one page is scanned data of an even-numbered page (i.e., whether the received scanned data of one page is scanned data of the back side of a document sheet) (S24). When determining that the received scanned data of one page is not scanned data of the back side of a document sheet, that is, scanned data of the front side of a document sheet (S24: No), the CPU 12 goes back to S20. Meanwhile, when determining that the received scanned data of one page is scanned data of the back side of a document sheet (S24: Yes), the CPU 12 proceeds to S26.

In S26, the CPU 12 makes a set of the scanned data received in S20 and scanned data one page before the received scanned data. Then, the CPU 12 compares the existing scanned data with the received scanned data in accordance with the rearrangement condition (S28).

Next, the CPU 12 stores the scan result before rearrangement, for instance, in the data storage area 28 of the memory 14 (S30). Then, the CPU 12 performs rearrangement according to the comparison result obtained in S28 (S32). Subsequently, the CPU 12 displays the scan results before and after the rearrangement (S34).

On the other hand, when determining in S22 that the duplex scanning setting is not active (S22: No), the CPU 12 skips S24 and S26, and proceeds to S28.

Figure 6A:
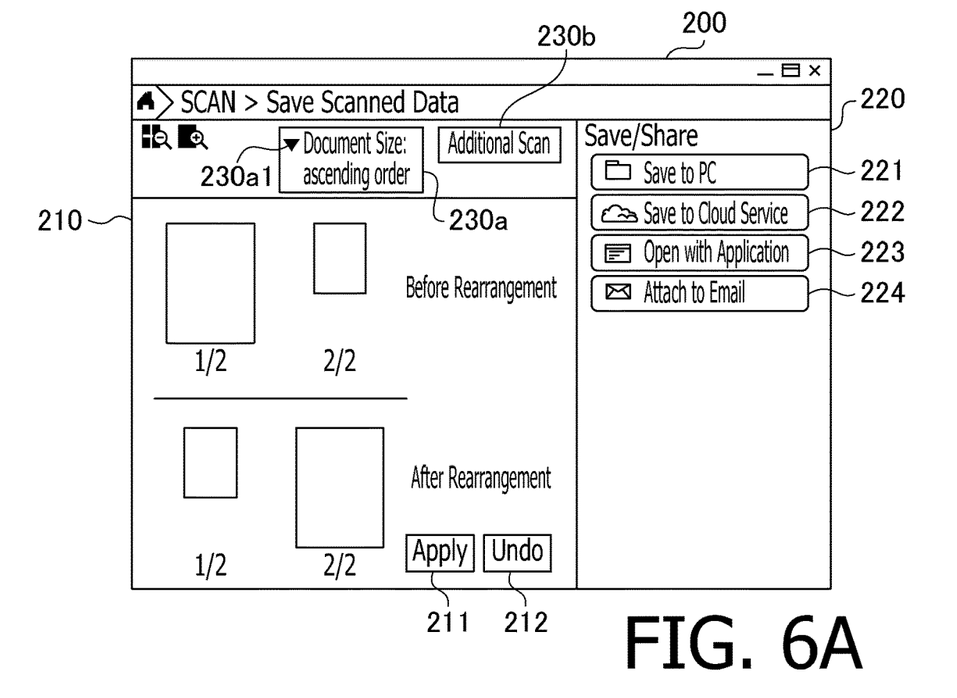
FIG. 6A shows an example of a scanned data saving screen displayed on the display of the PC, in the illustrative embodiment according to one or more aspects of the present disclosure.

FIG. 6A shows an example of a scanned data saving screen 200 displayed on the display 18 when the CPU 12 proceeds in a sequence of S20→S22→S28→S30→S32→S34. Specifically, FIG. 6A shows an example of the scanned data saving screen 200 displayed when the CPU 12 obtains scanned data generated by scanning, for instance, a B5-size document sheet, after obtaining, as the existing scanned data, scanned data generated by scanning, for instance, an A4-size document sheet as existing scanned data. Namely, in this example, two document sheets having different document sizes are scanned in the above order under the setting of "Document Size: Auto." Therefore, before rearrangement, the scanned data of the larger-size document sheet is first displayed, and the scanned data of the smaller-size document sheet is subsequently displayed.

The scanned data saving screen 200 displays thereon a "Current Rearrangement Setting" button 230a similar to the "Current Rearrangement Setting" button 111f (see FIG. 3A). On the "Current Rearrangement Setting" button 230a, "Document Size: ascending order" is displayed as the current rearrangement condition. Therefore, in S28, the CPU 12 compares the existing scanned data (i.e., the larger-size scanned data) and the obtained scanned data (i.e., the smaller-size scanned data) in accordance with the current rearrangement condition "Document Size: ascending order." Subsequently, according to the comparison result, the CPU 12 performs rearrangement in such an order as to place the smaller-size scanned data first and the larger-size scanned data next. Then, the CPU 12 displays a scan result before the rearrangement (hereinafter referred to as a "pre-rearrangement scan result") in which the scanned data is arranged in an order of the larger-size scanned data first and the smaller-size scanned data next, and a scan result after the rearrangement (hereinafter referred to as a "post-rearrangement scan result") in which the scanned data is rearranged in an order of the smaller-size scanned data first and the larger-size scanned data next. Thereby, the scanned data saving screen 200 as shown in FIG. 6A is displayed on the display 18.

When the duplex scanning setting is active (i.e., "Duplex Scanning Setting: ON" is selected), front-side scanned data and back-side scanned data are obtained from a single document sheet, and the two pieces of scanned data are treated as a set of scanned data. Therefore, the rearrangement according to the rearrangement condition is performed with the set of scanned data as a unit.

Referring back to FIG. 8, the CPU 12 subsequently determines whether all the scanned data has been obtained (S36). When determining that there still remains scanned data to be obtained (S36: No), the CPU 12 goes back to S20 and continues to execute S20 and the following steps. Meanwhile, when determining that all the scanned data has been obtained (S36: Yes), the CPU 12 proceeds to S38 in FIG. 9. The determination in S36 is, for instance, for a case where a plurality of document sheets are placed on an ADF ("ADF" is an abbreviation for "Automatic Document Feeder") and scanned at once. Nonetheless, even when the plurality of document sheets are scanned at once, the scanned data is rearranged each time a single document sheet is scanned. When the duplex scanning setting is active for a single document sheet, two pieces of scanned data are obtained from the said single document sheet. Meanwhile, when the duplex scanning setting is not active for a single document sheet, one piece of scanned data is obtained from the said single document sheet. Therefore, there may be two cases. i.e., a case where scanned data of a single document sheet contains two pieces of scanned data, and another case where scanned data for a single document sheet contains one piece of scanned data.

Figure 6B:
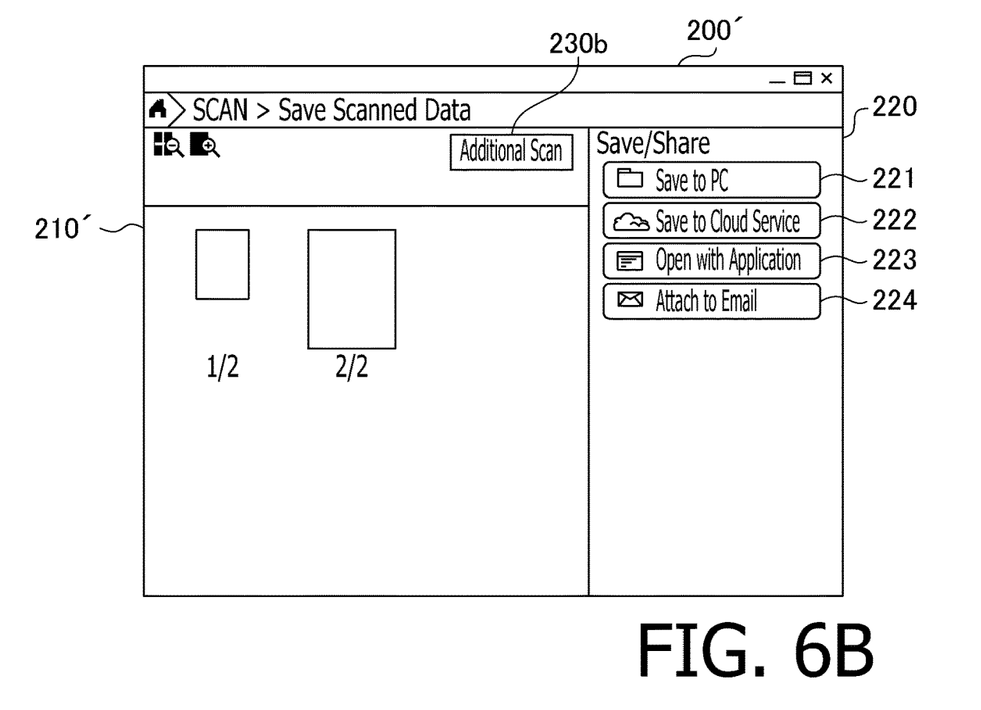
FIG. 6B shows an example of the scanned data saving screen displayed when an "Apply" button is pressed on the scanned data saving screen shown in FIG. 6A, in the illustrative embodiment according to one or more aspects of the present disclosure.

In S38 (see FIG. 9), the CPU 12 displays an "Apply" button 211 and an "Undo" button 212 on the display 18 (see FIG. 6A). Then, the CPU 12 determines whether the "Apply" button 211 has been pressed (S40). When determining that the "Apply" button 211 has been pressed (S40: Yes), the CPU 12 deletes the display of the pre-rearrangement scan result and displays only the post-rearrangement scan result (S42). Then, the CPU 12 terminates the rearrangement process. FIG. 6B shows an example of a scanned data saving screen 200' displayed when the "Apply" button 211 is pressed on the scanned data saving screen 200 shown in FIG. 6A. At this time, in addition to deleting the "Apply" button 211 and the "Undo" button 212 from the display on the display 18, the CPU 12 also deletes the "Current Rearrangement Setting" button 230a.

On the other hand, when determining in S40 that the "Apply" button 211 has not been pressed (S40: No), the CPU 12 determines whether the "Undo" button 212 has been pressed (S44). When determining that the "Undo" button 212 has been pressed (S44: Yes), the CPU 12 deletes the display of the post-rearrangement scan result and displays only the pre-rearrangement scan result (S46). Thereafter, the CPU 12 terminates the rearrangement process. At this time as well, in addition to deleting the "Apply" button 211 and the "Undo" button 212 from the display on the display 18, the CPU 12 also deletes the "Current Rearrangement Setting" button 230a.

On the other hand, when determining in S44 that the "Undo" button 212 has not been pressed (S44: No), the CPU 12 determines whether the "Additional Scan" button 230b (see FIG. 6A) has been pressed (S48). When determining that the "Additional Scan" button 230b has not been pressed (S48: No), the CPU 12 goes back to S38. Namely, the CPU 12 waits until one of the "Apply" button 211, the "Undo" button 212, and the "Additional Scan" button 230b is pressed. Meanwhile, when determining that the "Additional Scan" button 230b has been pressed (S48: Yes), the CPU 12 goes back to S18 (see FIG. 7) and transmits a scan instruction to perform additional scanning to the MFP 30. Thereafter, the CPU 12 continues to execute S20 (see FIG. 8) and the following steps.

As described above, FIG. 6A shows an example of the scanned data saving screen 200. On the scanned data saving screen 200, the "Current Rearrangement Setting" button 230a, similar to the "Current Rearrangement Setting" button 111f (see FIG. 3A), is displayed. Further, on the "Current Rearrangement Setting" button 230a, an operator 230a1, similar to the operator 111f1 (see FIG. 3A), is displayed. When the operator 230a1 is operated, the pull-down menu 111g (see FIG. 3B) is displayed. Namely, the user is allowed to change the rearrangement condition by selecting one of the selectable items listed in the pull-down menu 111g and reflect the change in the rearrangement of the scanned data, in the middle of obtaining all the scanned data (S36: No) or before the "Additional Scan" button 230b is pressed. It is noted that the items associated with the flags of "TRUE" in the rearrangement item list 28a are read out of the rearrangement item list 28a and listed in the pull-down menu 111g as the selectable items for the rearrangement condition.

As described above, FIG. 6B shows an example of the scanned data saving screen 200' displayed when the "Apply" button 211 is pressed. The scanned data saving screen 200' includes a preview display area 210' to display a preview of the scanned data, and a saving/sharing instruction area 220 to display a plurality of buttons for instructing saving/sharing of the scanned data.

The saving/sharing instruction area 220 displays therein a "Save to PC" button 221, a "Save to Cloud Service" button 222, an "Open with Application" button 223, and an "Attach to Email" button 224.

The "Save to PC" button 221 is a button for providing an instruction to save the scanned data (i.e., the scanned data after rearrangement in the example shown in FIG. 6B) in the data storage area 28 (e.g., in the HDD included in the memory 14) of the PC 10. The "Save to Cloud Service"

button 222 is a button for providing an instruction to save the scanned data to a server (not shown) connected via the network I/F 20. The "Open with Application" button 223 is a button for providing an instruction to start an application for editing (e.g., data conversion for) the scanned data and provide the application with a group of the scanned data. The "Attach to Email" button 224 is a button for providing an instruction to attach the scanned data to an email and send the email with the scanned data to a destination.

Figure 5B:
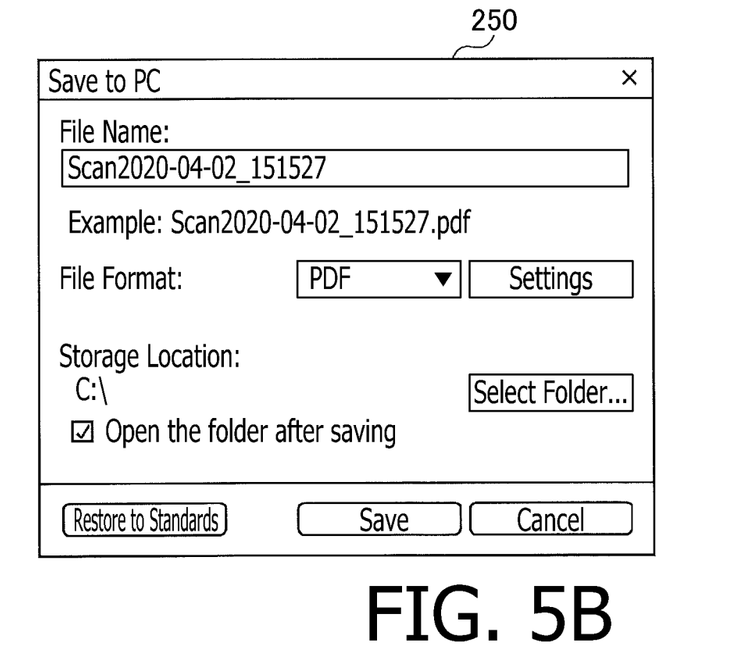
FIG. 5B shows an example of a "Save to PC" screen displayed in a pop-up manner on the display of the PC, in the illustrative embodiment according to one or more aspects of the present disclosure.

FIG. 5B shows an example of a "Save to PC" screen 250 displayed in a pop-up manner when the "Save to PC" button 221 is pressed. On the "Save to PC" screen 250, the user is allowed to change a file format and a storage location for saving a file, and thereby, to save the scanned data in the changed file format and in the changed storage location.

As described above, the information processing program 26*a* of the illustrative embodiment is executable by the CPU 12 of the PC 10 that includes the user I/F 16 and the display 18. The information processing program 26*a* is configured to, when executed by the CPU 12, cause the PC 10 to perform an accepting process (see e.g., S2 to S10), an obtaining process (see e.g., S20 to S26), a determining process (see e.g., S32), and a display process (see e.g., S34). The accepting process is a process to, before obtaining the scanned data, accept an operation to specify the rearrangement condition for the scanned data via the user I/F 16. The obtaining process is a process to obtain scanned data of a single document sheet. The determining process is a process to determine an arrangement order for arranging images contained in first scanned data and second scanned data, in accordance with the rearrangement condition specified by the operation accepted in the accepting process. The first scanned data is scanned data of one or more document sheets obtained earlier than the second scanned data in previous obtaining process(es). The second scanned data is the scanned data of the single document sheet obtained in the obtaining process. The display process is a process to display, on the display 18, the images contained in the first scanned data and the second scanned data, to be arranged in the arrangement order determined in the determining process.

Thus, the information processing program 26*a* of the illustrative embodiment makes it possible to automatically rearrange and display the obtained scanned data in a user-intended order. In addition, the scanned data is rearranged each time scanned data of a single document sheet is obtained. Therefore, the user is allowed to promptly check images contained in the scanned data after each rearrangement.

The obtaining process obtains the scanned data (S20). The rearrangement condition is a condition determined based on a parameter specified by an accepted operation from among a plurality of parameters included in the scan settings for generating the scanned data (see S2 to S10). The determining process determines the rearrangement order for the scanned data according to the specified parameter.

Thus, the rearrangement condition is determined based on the parameter specified by the accepted operation from among the plurality of parameters included in the scan settings for generating the scanned data. Namely, conditions that are meaningless to select as the rearrangement condition are eliminated. Hence, it is possible for the user to select, as the rearrangement condition, a user-intended one of selectable conditions that are meaningful to select.

Further, the accepting process makes it possible to accept an operation to specify a rearrangement condition corresponding to a specific parameter when the specific parameter is specified for the scan settings (S2 to S10).

Further, the determining process determines the arrangement order for the scanned data with a set of front-side scanned data and back-side scanned data of each document sheet as a unit, when the scan settings include the duplex scanning setting (S26).

Thus, it is convenient that rearrangement is performed with a set of front-side scanned data and back-side scanned data of a single document sheet as a unit.

Further, when the rearrangement condition is "Document Size," i.e., a size of each document sheet as an original of the scanned data, the determining process determines the arrangement order based on the size of each document sheet.

When the rearrangement condition is "OCR Character Order," i.e., an order of characters recognized by OCR processing for the scanned data, the determining process determines the arrangement order based on the order of the characters.

The display process displays the images contained in the first scanned data and the second scanned data in an arrangement order determined according to an obtainment order in which the first scanned data and the second scanned data were obtained. In addition, the display process also displays the images contained in the first scanned data and the second scanned data in an arrangement order determined according to a specified rearrangement condition. Further, when the user approves the display of the images arranged in the arrangement order determined according to the specified rearrangement condition, the display process deletes the display of the images arranged in the arrangement order determined according to the obtainment order of the scanned data, and leaves the display of the images arranged in the arrangement order determined according to the specified rearrangement condition.

Hereinabove, the illustrative embodiment according to aspects of the present disclosure has been described. Aspects of the present disclosure may be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that aspects of the present disclosure may be practiced without reapportioning to the details specifically set forth. In other instances, well known processing structures have not been described in detail, in order not to unnecessarily obscure the present disclosure.

Only an exemplary illustrative embodiment of the present disclosure and but a few examples of their versatility are shown and described in the present disclosure. It is to be understood that aspects of the present disclosure are capable of use in various other combinations and environments and are capable of changes or modifications within the scope of the inventive concept as expressed herein. For instance, the following modifications may be feasible.

In the aforementioned illustrative embodiment, scanned data, which is generated by the MFP 30 scanning document sheets in response to a scan instruction from the PC 10 and is transmitted to the PC 10, is used as image data. However, any type of image data (e.g., facsimile data received by the facsimile function, and photographic data captured by a digital camera) may be used as long as it is rearrangeable.

In the aforementioned illustrative embodiment, the MFP 30 is connected with the PC 10 through the network I/F 20 and the router 32 via the communication network. However, the MFP 30 may be directly connected with the PC 10, for instance, via a USB I/F, without going through the communication network.

In the aforementioned illustrative embodiment, the MFP 30 having the printing function and the scanning function is used. However, an image scanner having only the scanning function may be used instead of the MFP 30.

In the aforementioned illustrative embodiment, only a single MFP 30 is connected with the PC 10. However, a plurality of MFPs may be connected with the PC 10, and one of the plurality of MFPs may be selected as a target device. In this case, one or more image scanners may be connected with the PC 10 as selectable devices.

The following shows examples of associations between elements exemplified in the aforementioned illustrative embodiment and modifications and elements according to aspects of the present disclosure. The PC 10 may be an example of an "information processing device" according to aspects of the present disclosure. The CPU 12 may be an example of a "processor" of the "information processing device" according to aspects of the present disclosure. The memory 14 storing the information processing program 26a may be an example of a "non-transitory computer-readable medium" storing "computer-readable instructions" according to aspects of the present disclosure, and may be an example of a "memory" storing "computer-readable instructions" according to aspects of the present disclosure. The CPU 12 and the memory 14 storing the information processing program 26a may be included in a "controller" according to aspects of the present disclosure. The user I/F 16 may be an example of a "user interface" according to aspects of the present disclosure. The display 18 may be an example of a "display" according to aspects of the present disclosure.

What is claimed is:

1. A non-transitory computer-readable medium storing computer-readable instructions executable by a processor of an information processing device comprising a user interface and a display, the instructions being configured to, when executed by the processor, cause the information processing device to:
   accept, via the user interface, an operation to specify a rearrangement condition for a plurality of pieces of image data to be obtained;
   obtain image data of a single sheet;
   determine an arrangement order for arranging images contained in first image data and second image data, in accordance with the rearrangement condition specified by the accepted operation, the first image data being image data of one or more sheets obtained earlier than the second image data, the second image data being the image data of the single sheet; and
   display, on the display, the images contained in the first image data and the second image data, to be arranged in the determined arrangement order,
   wherein the instructions are further configured to, when executed by the processor, cause the information processing device to
   display the images contained in the first image data and the second image data to be arranged in an arrangement order determined according to a default rearrangement condition, and display the images contained in the first image data and the second image data to be arranged in the arrangement order determined according to the specified rearrangement condition, and
   when approval is given for the display of the images arranged in the arrangement order determined according to the specified rearrangement condition, delete the display of the images arranged in the arrangement order determined according to the default rearrangement condition, and leave the display of the images arranged in the arrangement order determined according to the specified rearrangement condition.

2. The non-transitory computer-readable medium according to claim 1, wherein the instructions are further configured to, when executed by the processor, cause the information processing device to:
   obtain scanned data as the image data;
   accept, via the user interface, the operation to specify a parameter from among a plurality of parameters included in scan settings for generating the scanned data, thereby determining the rearrangement condition based on the specified parameter; and
   determine the arrangement order in accordance with the specified parameter.

3. The non-transitory computer-readable medium according to claim 2, wherein the instructions are further configured to, when executed by the processor, cause the information processing device to, when a specific parameter is specified for the scan settings, accept the operation to specify the rearrangement condition according to the specific parameter.

4. The non-transitory computer-readable medium according to claim 2, wherein the instructions are further configured to, when executed by the processor, cause the information processing device to, when the scan settings include a duplex scanning setting, determine the arrangement order with a set of front-side scanned data and back-side scanned data of each document sheet as a unit.

5. The non-transitory computer-readable medium according to claim 2, wherein the instructions are further configured to, when executed by the processor, cause the information processing device to, when the rearrangement condition is a size of each document sheet as an original of the scanned data, determine the arrangement order based on the size of each document sheet.

6. The non-transitory computer-readable medium according to claim 2, wherein the instructions are further configured to, when executed by the processor, cause the information processing device to, when the rearrangement condition is an order of characters recognized by OCR processing for the scanned data, determine the arrangement order based on the order of the characters.

7. An information processing device comprising:
   a user interface;
   a display; and
   a controller configured to
   accept, via the user interface, an operation to specify a rearrangement condition for a plurality of pieces of image data to be obtained,
   obtain image data of a single sheet,
   determine an arrangement order for arranging first image data and second image data in accordance with the rearrangement condition specified by the accepted operation, the first image data being image data of one or more sheets obtained earlier than the second image data, the second image data being the image data of the single sheet, and
   display, on the display, images contained in the first image data and the second image data, to be arranged in an arrangement order determined according to a default rearrangement condition, and display the images contained in the first image data and the second image data to be arranged in the arrangement order determined according to the specified rearrangement condition, and when approval is given for the display of the images arranged in the arrangement order determined according to the specified rearrangement condition, delete the display of the images arranged in the arrangement order determined according to the default rearrangement condition, and leave the display of the images arranged in the arrangement order determined according to the specified rearrangement condition.

8. The information processing device according to claim 7, wherein the controller comprises:

a processor; and a memory storing computer-readable instructions configured to, when executed by the processor, cause the controller to accept, via the user interface, the operation to specify the rearrangement condition, obtain the image data of the single sheet, determine the arrangement order for arranging the first image data and the second image data in accordance with the rearrangement condition specified by the accepted operation, display, on the display, the images contained in the first image data and the second image data, to be arranged in the arrangement order determined according to the default rearrangement condition, and display the images contained in the first image data and the second image data to be arranged in the arrangement order determined according to the specified rearrangement condition, and when the approval is given for the display of the images arranged in the arrangement order determined according to the specified rearrangement condition, delete the display of the images arranged in the arrangement order determined according to the default rearrangement condition, and leave the display of the images arranged in the arrangement order determined according to the specified rearrangement condition.

9. A method implementable on a processor of an information processing device comprising a user interface and a display, the method comprising:

accepting, via the user interface, an operation to specify a rearrangement condition for a plurality of pieces of image data to be obtained;

obtaining image data of a single sheet;

determining an arrangement order for arranging first image data and second image data in accordance with the rearrangement condition specified by the accepted operation, the first image data being image data of one or more sheets obtained earlier than the second image data, the second image data being the image data of the single sheet; and displaying, on the display, images contained in the first image data and the second image data, to be arranged in an arrangement order determined according to a default rearrangement condition, and displaying the images contained in the first image data and the second image data to be arranged in the arrangement order determined according to the specified rearrangement condition; and when approval is given for the displaying of the images arranged in the arrangement order determined according to the specified rearrangement condition, deleting the displaying of the images arranged in the arrangement order determined according to the default rearrangement condition, and leaving the displaying of the images arranged in the arrangement order determined according to the specified rearrangement condition.

* * * * *

UNITED STATES PATENT AND TRADEMARK OFFICE
CERTIFICATE OF CORRECTION

| | |
|---|---|
| PATENT NO. | : 11,483,449 B2 |
| APPLICATION NO. | : 17/315708 |
| DATED | : October 25, 2022 |
| INVENTOR(S) | : Nobukazu Kodera |

It is certified that error appears in the above-identified patent and that said Letters Patent is hereby corrected as shown below:

In the Claims

Column 16, Claim 9, Line 20:
Please change: "single sheet; and" to -- single sheet; --

Signed and Sealed this
Eighth Day of October, 2024

Katherine Kelly Vidal
*Director of the United States Patent and Trademark Office*